UNITED STATES PATENT OFFICE.

ARTHUR BRIN, OF LONDON, COUNTY OF SURREY, ASSIGNOR TO THE CONTINENTAL OXYGEN COMPANY, (LIMITED,) OF WESTMINSTER, ENGLAND.

PROCESS OF OBTAINING OXYGEN FROM AIR.

SPECIFICATION forming part of Letters Patent No. 432,815, dated July 22, 1890.

Application filed February 21, 1890. Serial No. 341,351. (No specimens.)

*To all whom it may concern:*

Be it known that I, ARTHUR BRIN, engineer and chemist, a citizen of the Republic of France, residing at 181 Upper Kennington Lane, in the county of Surrey, England, have invented a certain Improvement in Obtaining Oxygen and Nitrogen from Atmospheric Air, of which the following is a specification.

This invention has reference to the production of oxygen and nitrogen by what is known as the "barium-oxide process." According to this process air is admitted to retorts containing barium oxide, the retorts being heated to a temperature at which the barium oxide will combine with the oxygen of the air, forming peroxide of barium. The nitrogen passes on and is collected in suitable vessels. After the operation of peroxidation has been completed, the temperature of the retorts being raised, the peroxide gives off the extra equivalent of oxygen and is reduced again to barium oxide. This operation is assisted by the application of a vacuum-pump. The temperature being again reduced, the operation of peroxidation is repeated, the changes of temperature being effected after each operation of peroxidation or deoxidation. This change of temperature is desirable to obtain the greatest yield of oxygen per operation; but I have discovered that without this change of temperature, while I obtain much less yield per operation, I can repeat the operations so much more rapidly than I can in a succession of operations—say extending over a day's work—obtain a much larger aggregate yield as the result of that day's work. The importance of this discovery from an industrial standpoint is very great, since the principal cost and delay in the present process are due not so much to the high temperatures employed as to the frequent changes in temperatures. To be more explicit, it may be stated that by the practical application of the discovery above mentioned the cost of producing oxygen and nitrogen has been reduced to about one-fifth the cost of the old process under the most favorable conditions, and that—say where six or eight operations per diem represented the maximum capacity of a plant (owing to the delays for changing the heat)—one hundred and forty-four operations per diem can now be performed, so that it will be seen that, supposing the yield per operation to be according to this invention, only a small part of the yield per operation according to the process wherein change of temperature is employed, yet the aggregate yield per day in the former case will be much larger than in the latter case. The saving specified is partly in the cost of the fuel hitherto used to raise the furnace to a higher temperature, in the units of heat hitherto wasted in cooling down, and in the time lost between the two operations when the plant was idle. The alternate heating and cooling, moreover, produced great strain on the apparatus, causing leaks and producing rapid deterioration. The saving in repairs and life-time of the plant by the new process is also very great.

In proceeding according to the present process the barium is placed in retorts such as heretofore used, and air is forced into the same, the retorts being kept at a temperature of about 730° to 750° centigrade. This is found to be the best temperature to employ; but any degree of heat—say between 650° centigrade and 800° centigrade—will give practical results; and the invention consists not so much in the employment of a particular temperature (which within certain limits may be varied) as in peroxidizing and deoxidizing at substantially the same temperature. After peroxidation is complete and without changing the temperature the air-supply is shut off and an exhaust-pump connected with the retorts, when the peroxide rapidly gives off the oxygen taken from the air, which oxygen is collected in suitable vessels as heretofore.

The use of an exhaust or vacuum pump is not of course essential, as other means may be employed to reduce the pressure in the retorts after peroxidation. It is, however, essential to the process that the operations of peroxidation and deoxidation should be conducted under different pressures, the higher pressure being used during the former operation and the lower pressure during the latter.

The operations of peroxidation and deoxidation are carried on alternately and without any delay.

I claim as my invention or discovery—

1. The herein-described process of obtaining oxygen and nitrogen from atmospheric air, said process consisting in heating barium oxide to a suitable temperature, as indicated, admitting air thereto until peroxidation takes place, then shutting off the air-supply and deoxidizing the barium by reducing the pressure without changing the temperature of the heating-chamber, as set forth.

2. The herein-described process of obtaining oxygen and nitrogen from atmospheric air, said process consisting in heating barium oxide in retorts to a suitable temperature, as indicated, forcing air into said retorts under pressure until peroxidation is complete, then shutting off the air-supply and withdrawing the oxygen from the peroxide by suction without changing the temperature of the heating-chamber, as set forth.

In testimony whereof I have signed my name to this specification in the presence of two subscribing witnesses.

ARTHUR BRIN.

Witnesses:
T. N. HESTER,
34 *Victoria St., Westminster, S. W.*
W. I. WEEKS,
9 *Birchin Lane, London, E. C.*